United States Patent [19]  [11] 3,967,999
Sommerfeld et al.  [45] July 6, 1976

[54] HIGH FREQUENCY PLASTIC WELDING FLUX

[75] Inventors: Dieter Sommerfeld, Monheim-Baumberg; Bernhard Kowald, Opladen-Lutzenkirchen; Monika Winkels, Dusseldorf-Wersten, all of Germany

[73] Assignee: Henkel & Cie G.m.b.H., Dusseldorf, Germany

[22] Filed: Oct. 29, 1974

[21] Appl. No.: 518,246

[30] Foreign Application Priority Data
Nov. 3, 1973 Germany............................ 2355016

[52] U.S. Cl. ........................ 156/273; 260/29.6 XA; 260/29.6 R; 260/29.6 PM; 260/29.6 ME
[51] Int. Cl.$^2$ .......................................... B29C 27/04
[58] Field of Search ............... 260/29.6 R, 29.6 ME, 260/29.6 XA, 29.6 PM; 156/273

[56] References Cited
UNITED STATES PATENTS

| | | | |
|---|---|---|---|
| 3,409,578 | 11/1968 | Hwa............................ | 260/29.6 ME |
| 3,423,353 | 1/1969 | Levine et al................ | 260/29.6 EM |
| 3,637,563 | 1/1972 | Christena...................... | 260/29.6 R |
| 3,762,979 | 10/1973 | Hanel et al. ......................... | 156/273 |
| 3,781,243 | 12/1973 | Gulbins et al.................. | 260/29.6 R |
| 3,862,870 | 1/1975 | Suda et al........................... | 156/273 |

*Primary Examiner*—Edward G. Whitby
*Attorney, Agent, or Firm*—Hammond & Littell

[57] ABSTRACT

A high-frequency plastic welding flux, characterized in that the dispersion contains a redispersible powder of a polymer prepared by suspension polymerization which consists of polyvinyl chloride and/or copolymers of vinyl chloride with monomers copolymerizable with vinyl chloride; as well as a process for using this flux for high-frequency welding.

5 Claims, No Drawings

HIGH FREQUENCY PLASTIC WELDING FLUX

THE PRIOR ART

It is known that molded fiber boards, chipboards, table plates, foamed plastic sheets, non-woven fabrics, or the like can be joined to sheets made from various plastics, especially thermoplastics. When between the parts to be joined, there is first applied a so-called plastic welding flux to one or both surfaces to be joined. After the solvent or water has been dried off, the welding is effected by using a high-frequency electric field. These high-frequency plastic fluxes consist of thermoplastics which because of their chemical structure heat up rapidly in a high-frequency electric field. Suitable thermoplastics are, for example, polyvinyl chloride ("PVC") and copolymers of vinyl chloride with other monomers copolymerizable therewith, such as for example, vinyl acetate or acrylic acid esters. One proposed method of application of these thermoplastics is that they are first dissolved in a highly volatile solvent, such as tetrahydrofuran, methyl ethyl ketone, optionally with the addition of cyclohexanone, and then applied. Next, the organic solvent must be evaporated to a large extent. Such a process involves disadvantages which are especially evident when solvents likely to explode, or toxic solvents, are used. Therefore, aqueous dispersions of polyvinyl chloride in water have been used for the same purpose. These dispersions were prepared by emulsion polymerization. However, they have the disadvantage that their drying rate is considerably slower than that of the products containing solvents. Moreover, when the compounds prepared with these PVC-dispersions are aged, their adhesion becomes unsatisfactory in many cases. When commercial dispersions are used, it is often not possible to apply a sufficient quantity to obtain satisfactory adhesion in all cases.

OBJECTS OF THE INVENTION

It is an object of the present invention to provide for the preparation of dispersions of PVC or copolymers of vinyl chloride with copolymerizable monomers which do not possess the above-described disadvantage and which are fast drying. The results therefore is boards, foamed plastics, or the like which can be rapidly coated, and are capable of stacking, and are weldable by means of high-frequency.

This and other objects of the present invention will become apparent as the description thereof proceeds.

DESCRIPTION OF THE INVENTION

The present invention provides dispersions useful as high-frequency plastic welding fluxes which contain, as an essential constituent, a redispersible polymer powder, prepared by suspension polymerization, and consisting of polyvinyl chloride and/or copolymers of vinyl chloride with monomers copolymerizable therewith.

More particularly the present invention provides a high-frequency plastic welding flux consisting essentially of (A) from 20 to 40% by weight based upon the total weight of a redispersible powder of a polymer prepared by suspension polymerization selected from the group consisting of (1) polyvinyl chloride, (2) copolymer of vinyl chloride with up to 20% by weight based upon the copolymer weight of an olefinically-unsaturated monomer copolymerizable with vinyl chloride, and (3) the mixtures of (1) and (2); (B) from 1 to 5% by weight based upon the total weight of a nonionic surface-active agent; and (C) the remainder up to 100% by weight of an aqueous dispersion.

The present invention is in addition directed to an improvement in the process for preparing a welded article by high-frequency welding comprising
   providing a layer of thermoplastic material and a substrate;
   coating at least one of said layer of material or said substrate with an intermediate flux material;
   juxtaposing said layer of thermoplastic material and said substrate with said intermediate flux material therebetween;
   welding said layer of thermoplastic material to said substrate by using a high-frequency electric field; and
   recovering said welded article; wherein the improvement consists in using the above-mentioned auxiliary high-frequency welding flux, as said intermediate flux material.

Suitable polyvinyl chloride compounds include all the known PVC compounds of the so-called "pastable" type. These compounds have a K-value of about 50 to 80. It is also possible to use a copolymer of vinyl chloride with up to 20% by weight based upon the copolymer weight of an olefinically-unsaturated monomer copolymerizable with vinyl chloride.

Examples include the copolymers of vinyl chloride with vinyl esters of lower alkanoic acids such as vinyl acetate and/or vinylidene chloride and/or acrylic acid esters which can likewise be made pastable. The amount of comonomer does not exceed more than 20% by weight based upon the monomer mixture. Moreover, small quantities of vinyl propionate or vinyl esters of higher fatty acids, for example, lauric acid, can also be used as comonomers of vinyl chloride. Furthermore, the copolymerizates can contain small quantities of unsaturated carboxylic acids or their anhydrides, for example alkenoic acids having 3 to 5 carbon atoms such as acrylic acid, methacrylic acid, and alkenedoic acids having 4 to 6 carbon atoms such as crotonic acid, maleic acid, itaconic acid, fumaric acid; or also maleic anhydride. The polyvinyl chloride compounds range from 20 to 40% by weight based upon the total weight of the dispersion.

Nonionic surface-active agents are an additional essential constituent of the dispersions according to the invention. Suitable surface-active agents can be prepared by the addition of ethylene oxide to fatty acids having 12 to 18 carbon atoms. These surface-active agents contain about 4 to 40 oxyethylene groups. Also to be considered are the adducts of ethylene oxide with sorbitan laurates, sorbitan stearates, or sorbitan oleates. In that case, the number of the added oxyethylene groups should amount to 20 to 80.

Another group of suitable surface-active ethylene oxide adducts are the ethylene oxide adducts with higher fatty alcohols, or with alkylphenols having 6 to 10 carbon atoms in the alkyl group. The fatty alcohols themselves should have from 12 to 18 carbon atoms. About 10 to 50 oxyethylene groups should be added per mol of the fatty alcohol or of the alkyl phenol. Finally, block polymers of ethylene oxide and propylene oxide are usable as dispersing agents. Additional auxiliary agents which can be used are ionic emulsifiers, such as for example, anionic surface-active agents, such as the soluble salts of sulfonation products prepared from higher fatty acid esters or the soluble salts of sulfonation products prepared from alkyl phenols. However, only small quantities of these products are to be used at the most 25% of the total amount of surface-active agents. The amount of surface-active agent in the dispersion is from about 1 to 5%, especially from 1.5 to 3%, based upon the total weight of the dispersion.

All of the following ingredients, as well as water, form part of an aqueous dispersion forming preparation into which the PVC polymer is dispersed using the above surface-active agents.

In addition to the above-mentioned thermoplastic polymers, there can also be present minor quantities of other polymers, for example, copolymerizates of styrene and acrylic acid or styrene and butadiene and/or maleic anhydride, or the like. Suitable additives are also vinyl acetate polymers or copolymers of vinyl acetate with ethylene. However, the amount of such polymers on a dry-basis should not exceed 20%, based on the total dispersion.

Further additives for the high-frequency plastic welding fluxes of the invention include pigments, such as titanium dioxide, iron oxide, calcium carbonate, ground alumina, or the like. The amount of pigments should not exceed 12%, and preferably ranges between 2 and 8% based on the total weight of the disperion.

Finally, it is possible to add so-called dispersion stabilizers which are hydrocolloids, forming more or less viscous solutions. Examples include polyacrylamide, partially hydrolyzed polyacrylamide, partially hydrolyzed polyacrylic acid ester, polyvinyl methyl ether, polyvinylpyrrolidone, methylcellulose, hydroxyethylcellulose, methylhydroxyethylcellulose, methylhydroxypropylcellulose, polyvinyl alcohol, xantham gum or the like, or a dispersion initiator.

In most cases, commercial antifoaming agents are advantageously used during the manufacture, since these agents also exert a favorable effect during the application of the high-frequency plastic welding fluxes. The amount of the above-named additional agents present should not exceed 2%, preferably from about 0.5 to 1%, by weight.

The high-frequency plastic welding fluxes are manufactured by simple homogenization of the individual constituents. First, water and the surface-active agent are charged; and then, the suspension polymer and the remaining additional agents are added. If necessary, the pH may be adjusted to the desired value by adding alkali substances, such as ammonia or amines. The desired range is from about pH 5 to pH 9.

The high-frequency plastic welding flux of the invention may be used to bond together materials such as molded fiber boards, chipboards, table plates, foamed plastic sheets, non-woven fabrics and thermoplastic sheets, such as PVC plastic sheets.

Finally, the flow properties as well as the strength and elasticity of the seams to be welded later on can be improved by the stirring-in of plasticizers, for example, phthalic acid diesters such as dioctyl phthalate, didodecyl phthalate, diisodecyl phthalate, dimethylcyclohexyl phthalate, or the cresol-phenol ester of pentadecyl sulfonic acid, or plasticized emulsions of, for example, vinyl acetate - ethylene copolymers. The amount of these additives to be used is a minor amount, which in no case, should exceed 20% of the dispersion.

The dispersions according to the invention have the advantages of having a viscosity of 100 to 1,500 cP according to Epprecht, and can be stored unchanged for months. The viscosity can be varied, depending upon the composition and the sequence of addition. It is easy to obtain pourable dispersions or suspensions having Epprecht viscosities of 100 to 250 cP at 20°C. The plastic welding fluxes dry on many types of substrates within a short time. These dispersions result in compositions resistant to tear which are distinguished by an excellent resistance to ageing, especially when high-frequency welded with plasticized PVC.

The following examples are merely illustrative of the present invention without being deemed limitative in any manner thereof.

EXAMPLE 1

A high-frequency plastic welding flux was prepared by the dispersion of the following ingredients in the stated sequence:

254 ml of water,
18.2 gm of surface-active agent (product of the addition of 6 mol ethylene oxide to a technical mixture of $C_{12}$ to $C_{18}$ fatty acids),
236 gm of a "pastable" PVC powder (K-value = 70),
9 gm of commerial antifoaming agent, based on silicon,
27 gm of titanium dioxide,
2 gm of ammonia, concentrated,
91 gm of emulsion copolymerizate of styrene and small quantities of acrylic acid, and
362 gm of a 50% aqueous dispersion of a copolymer of vinyl acetate and ethylene (ethylene content = 15%).

The pH value was 7.1. The finished dispersion had an Epprecht viscosity of 180 cP at 20°C.

Even after 2 months, this dispersion was completely unchanged with respect to flow behaviour, i.e., viscosity. The dispersion prepared as described above was applied to molded fiber boards with a thickness of application of 0.3 mm. After storing at 20°C for 19 minutes, a coating, solid as a block, had been formed. Then, a plasticized PVC foil of 280$\mu$ thickness and having an outer layer of a commercial polyacrylate fleece of about 5 mm thickness, was seam-welded onto the coated molded fiber board by means of a high-frequency welding device. The peeling resistance across the seam about 5 cm width was determined in a tearing machine having the stripping rate of about 100 mm/min. The peeling resistance was 14 kp/5 cm. Then, test specimens were prepared, tempered at 105°C for four hours. After they had been cooled to room temperature, their peeling resistance was determined and found to be 15 kp/5 cm.

EXAMPLE 2 (COMPARATIVE)

A commercial dispersion of polyvinyl chloride containing about 20% butyl acrylate was applied to molded fiber boards in a manner analogous to that described above in Example 1. Examination showed that 28 minutes were needed until they dried so that they could be stacked together. The peeling resistance was determined. A value of 12 kp/5 cm was measured immediately after welding. However after storing at 105°C for 4 hours, the measured value was only 9.4 kp/5 cm.

Although the present invention has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

We claim:

1. In the process for preparing a welded article by high-frequency welding comprising
providing a layer of thermoplastic material and a substrate;
coating at least one of said layer of thermoplastic material or said substrate with an intermediate material;
juxtaposing said layer of thermoplastic material and said substrate with said coating of intermediate material therebetween;
welding said layer of thermoplastic material to said substrate by application of a high-frequency electric field; and
recovering said welded article: the improvement wherein said intermediate coating material is a high frequency plastic welding flux consisting essentially of
   A. from 20 to 40% by weight based upon the total weight of a redispersible powder of a polymer prepared by suspension polymerization selected from the group consisting of (1) polyvinyl chloride, (2) copolymer of vinyl chloride with up to 20% by weight based upon the copolymer weight of an olefinically-unsaturated monomer copolymerizable with vinyl chloride, and (3) the mixtures of (1) and (2);
   B. from 1 to 5% by weight based upon the total weight of a nonion surface-active agent; and
   C. the remainder up to 100% by weight of an aqueous medium selected from the group consisting of water and aqueous dispersions of polymers selected from the group consisting of copolymerizates of styrene and acrylic acid, copolymerizates of styrene and butadiene, copolymerizates of styrene and maleic acid anhydride, copolymerizates of styrene, butadiene and maleic acid anhydride, vinyl acetate polymers and copolymerizates of vinyl acetate and ethylene.

2. The process of claim 1, wherein said intermediate material is applied to an entire surface of said layer of thermoplastic material or said substrate.

3. The process of claim 1, wherein said substrate is selected from the group comprising molded fiber board, chipboards, table plate, framed plastic sheet and non-woven fabrics.

4. The process of claim 1 wherein, in (A) (2) said copolymer of vinyl chloride with up to 20% by weight of an olefinically-unsaturated monomer copolymerizable with vinyl chloride is selected from the group consisting of a copolymer of vinyl chloride with vinyl acetate, a copolymer of vinyl chloride with vinylidene chloride, a copolymer of vinyl chloride with an acrylic acid ester, and the mixtures thereof.

5. The process of claim 1 wherein, in (B), there is from 1.5 to 3% by weight based upon the total weight of a nonionic surface-active agent.

* * * * *